United States Patent [19]

Ojakaar

[11] Patent Number: 4,983,680

[45] Date of Patent: Jan. 8, 1991

[54] CURED PERFLUOROELASTOMERS AND THEIR PREPARATION

[75] Inventor: Leo Ojakaar, Hockessin, Del.

[73] Assignee: E. I. Du Pont de Nemours and Company, Wilmington, Del.

[21] Appl. No.: 198,280

[22] Filed: May 25, 1988

[51] Int. Cl.$^5$ ................................................ C08F 8/00
[52] U.S. Cl. ................................. 525/281; 525/326.3; 525/326.4; 525/387
[58] Field of Search ................... 525/281, 326.3, 326.4

[56] References Cited

U.S. PATENT DOCUMENTS

| | | | |
|---|---|---|---|
| 3,894,118 | 7/1975 | Aronoff et al. | 525/281 |
| 4,281,092 | 7/1981 | Breazeale | 525/326.3 |
| 4,394,489 | 7/1983 | Aufdermarsh | 525/326.3 |

FOREIGN PATENT DOCUMENTS 61-06905  4/1986  Japan.

*Primary Examiner*—Bernard Lipman
*Attorney, Agent, or Firm*—Donald W. Huntley

[57] ABSTRACT

Perfluoroelastomers of tetrafluoroethylene, perfluoro (alkylvinylether) and a cure site monomer crosslinked with organic peroxide curing agent, and a process for their preparation.

5 Claims, 1 Drawing Sheet

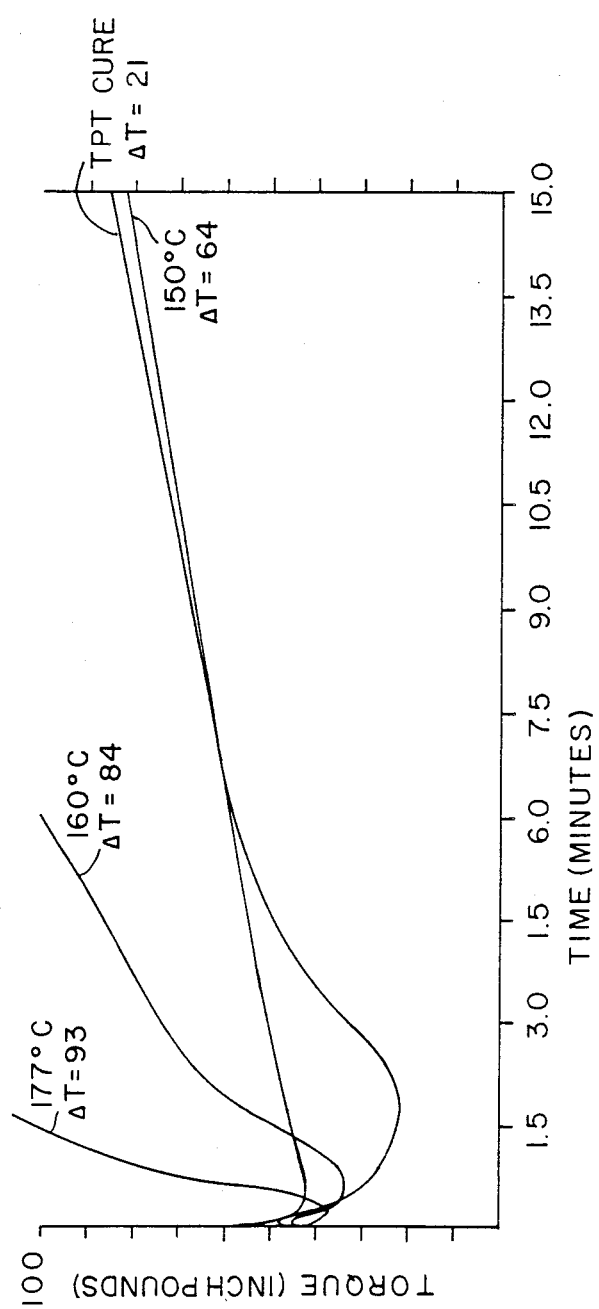

CURED PERFLUOROELASTOMERS AND THEIR PREPARATION

BACKGROUND OF THE INVENTION

Perfluorelastomers have long been used in a variety of applications that require excellent resistance to high temperatures and chemical attack. A particularly outstanding class of fluoropolymers that has been used in elastomeric applications is that prepared from tetrafluoroethylene (TFE) and perfluoro (alkylvinylether) such as perfluoro (methylvinylether) (PMVE). To permit the crosslinking in these polymers that is essential to good elastomeric properties, a small percentage of termonomer is incorporated. A wide variety of such crosslinking sites has been used in the past, including those described in Brizzolara et al., U.S. Pat. No. 3,682,872.

One particularly desireable terpolymer is that prepared from TFE, PMVE and a nitrile cure site monomer, such as perfluoro (8-cyano-5-methyl-3,6-dioxa1-octene), or 8CNVE. This fluoropolymer has been cured in the past by organometallic compounds such as tetraphenyltin, which results in trimerization of the cyano function of the 8CNVE to triazine crosslinks. However, the high viscosity of the resulting compound and the slow rate of cure make the processing of this crosslinked material difficult. In addition, because the triazine crosslinks are prone to nucleophilic attack, they have inadequate resistance to aliphatic amines and water at elevated temperatures, particularly above 150° C. Further improvement in these properties in the cured perfluoroelastomer has therefore been desired, along with improved processability. It would be also desirable to eliminate the need for the toxic organometallic compounds often used in the curing operation.

Accordingly, continuing effort has been directed to the development of curing systems which result in improved physical properties in the cured elastomer and which permit curing at the least stringent conditions.

SUMMARY OF THE INVENTION

The present invention provides a cured perfluoroelastomer which exhibits excellent hydrolytic stability, and a process for its preparation which eliminates the need for the organometallic curing compounds which have been used in the past.

Specifically, the present invention provides, in a cured perfluoroelastomer composition prepared from polymerized units of tetrafluoroethylene, perfluoro (alkylvinylether) and a nitrile cure site monomer, the improvement wherein the perfluoroelastomer is crosslinked with a carbon-carbon linkage.

The instant invention further provides, in the process for crosslinking a perfluoroelastomer of the type comprising polymerized units of tetrafluoroethylene, perfluoro (alkylvinylether) and a nitrile cure site monomer by contacting the perfluoroelastomer with crosslinking agent under reaction conditions, the improvement wherein the crosslinking agent comprises an organic peroxide and a peroxide coagent free radical source.

BRIEF DESCRIPTION OF THE FIGURE

The FIGURE is a graphical representation of the performance characteristics of cured perfluoroelastomers of the present invention as compared to those prepared using a previous curing system.

DETAILED DESCRIPTION OF THE INVENTION

The present invention relates to terpolymers of tetrafluoroethylene, perfluoro(methyl vinyl ether) and a termonomer which provides a nitrile cure site in the terpolymer. While a wide variety of such termonomers can be used, a particularly preferred species is perfluoro (8-cyano-5-methyl-3,6-dioxa-1-octene). These terpolymers and their preparation are described in detail in Breazeale, U.S. Pat. No. 4,218,092, hereby incorporated by reference.

The present invention is based on the discovery that the above perfluroinated terpolymers can be effectively crosslinked through the use of organic peroxides in conjunction with a peroxide co-agent.

The curing process of the present invention is carried out by bringing the terpolymers into contact, under reaction conditions, with an organic peroxide and a co-agent, and preferably a strong organic base having a pKa greater than about 10, and preferably greater than about 12.

Organic peroxides which can be used in the present invention include a wide variety of alkyl peroxides of the type generally used in peroxide curing reactions. The organic peroxides are generally present in an amount of about from 1 to 3 parts of the peroxide per 100 parts of fluoropolymer. One peroxide curing agent which has been found to be particularly satisfactory, and is accordingly preferred, is alpha, alpha' bis(t-butylperoxy)diisopropylbenzene, commercially available from Hercules, Inc. This curing agent is also available from Wyrough & Loser, Inc. in a composition comprising 40% polymeric binder, as Vul-Cup K(VC)D-60.

A wide variety of peroxide co-agents can be used in the present invention. However, trimethallyl isocyanurate, triallyl isocyanurate and trimethylolpropane trimethacrylate have been found to give excellent performance, of which trimethallyl isocyanurate is particularly preferred. The peroxide co-agents are generally present in an amount of about from 1 to 3 parts of the co-agent per 100 parts of the fluoropolymer.

It is preferred that the crosslinking reaction be carried out in the presence of a strong organic base, that is, one having a pKa of at least about 10, and prefereably at least about 12. The organic base acts as an accelerator, a processing aid and a scavenging agent, and has been found to improve the physical characteristics of the cured elastomer, including tensile properties, modulus, and compression set. One such base which has been found to be particularly satisfactory is 1,8-bis-(dimethylamino) naphthalene, commercially available from Aldrich Chemical Company as Proton Sponge. The organic bases, when used, are generally present in an amount of about from 0.1 to 1.0 parts of the base per 100 parts of perfluoropolymer. About from 0.4 to 0.6 parts have been found to be particularly satisfactory.

The fluoropolymer compositions can also contain a wide variety of additives of the type normally used in the preparation of elastomeric compositions, such as pigments, fillers and pore-forming agents, as will be evident to those skilled in the art.

In the present curing process, the fluoroelastomer, with the required amounts of organic peroxide, co-agent, and other components, is compounded by conventional means, such as in a two-roll mill, at elevated temperatures. It has surprisingly been discovered that the curing reaction, using the components of the present invention, can be carried out at lower temperatures than are typically used for curing using other techniques. Specifically, the process of the present invention can be effectively carried out at temperatures of about from 40° to 70° C., and preferably about from 50° to 60° C.

The curing times required will vary according to the particular polymer and the compound formulation used, but a curing period of about from 15 to 30 minutes is generally found to be satisfactory. After curing, it is preferred to post cure the elastomer by heating in an inert atmosphere, such as nitrogen, for an extended period at temperatures higher than the curing temperature, according to known techniques.

The resulting cured perfluoroelastomer is characterized by a carbon-carbon crosslinking moiety, which results in outstanding hydrolytic stability. Infrared analysis of the crosslinked compositions confirms the absence of triazine linkages which are formed using other curing systems such as TPT.

The cured compositions of the present invention exhibit a surprising stability in a wide variety of environments, including unusual resistance to degradation by water and ethylene diamine. This outstanding hydrolytic stability is achieved without substantial depreciation of the excellent tensile properties of the elastomer. In addition, the peroxide cured elastomers of the present invention exhibit good long term thermal stability, which is particularly surprizing in view of experience with other fluoroelastomers which shows a marked depreciation of thermal stability with the use of peroxide cure systems.

The instant invention is further illustrated by the following specific Examples, in which parts and percentages are by weight unless otherwise indicated.

EXAMPLE 1 AND COMPARATIVE EXAMPLE A

In Example 1, a cured perfluoroelastomer was prepared by mixing, on a two-roll rubber mill at 60° C., 100 parts of perfluoroelastomer of TFE/PMVE/8CNVE in a ratio of 56.8/41/2.2, 12 parts of carbon black SAF, 6.75 parts of K(VC)D-60 dispersion containing 2.7 parts of alpha, alpha' bis(t-butylperoxy)diisopropylbenzene peroxide curing agent, 2 parts of trimethallylisocyanurate peroxide co-agent, and 0.5 parts of 1,8-bis-(dimethylamino) naphthalene organic base. The mixture was milled for 20 minutes.

In Comparative Example A, the above procedure was repeated, except that the perfluoroelastomer was cured with 3 parts of tetraphenyltin at 199° C.

Samples of the resulting compounds were press-cured in an electrically heated press for 10 minutes at 177° C. and post cured in a circulating nitrogen atmosphere oven under the conditions summarized in Table I. The samples were subsequently tested for physical properties.

The degree of crosslinking was measured in a Monsanto Moving Disc Rheometer (MDR) at 177° C.

The MDR and physical testing results are summarized in Table I and, in FIG. 1, are compared at 150°, 160°, and 177° C. to compositions of Comparative Example A. The test results indicate that the peroxide curing agents used according to the present invention are significantly more active than TPT, as shown by the higher delta torque values of the MDR measurements. Moreover, the present peroxide compounds provide excellent vulcanized perfluoroelastomer compositions which can be cured more rapidly and at lower temperatures than compositions prepared using TPT curing.

The present compositions also generally attain a more complete state of cure during the conventional press curing operation and require less severe post-curing conditions of 24 hours at 232° C. The physical properties compared in Table I for the peroxide cured compositions and those cured with TPT are substantially equivalent, and the present compositions are significantly more resistant to exposure to hot water.

TABLE I

| Example | Comparison A | Example 1 |
|---|---|---|
| Compounding | | |
| Perfluoroelastomer | 100 | 100 |
| Carbon Black | 12 | 12 |
| 18-Crown-6 | 0.3 | 0.3 |
| TPT | 3 | — |
| K(VC)D-60 | — | 6.75 |
| Proton Sponge | — | 0.5 |
| Trimethallyl-isocyanurate | — | 4 |
| Testing of Compound | | |
| MDR - 30 Min. Trace, 1° Arc | 199° C. | 177° C. |
| Min. | 42.1 | 24.0 |
| Max. | 81.5 | 130.2 |
| Torque | 39.4 | 106.2 |
| ts2 | 2.27 | 1.58 |
| tc90 | 26.31 | 6.94 |
| Curing of Compound | | |
| Press Cure | | |
| Time (Min)/Temp °C. | 30/210 | 10/177 |
| Post Cure (under $N_2$) | (PCN 42) | |
| | 6/90 | |
| Time (Hrs)/Temp °C. | 10/90 to 350 | 24/232 |
| | 26/305 | |
| Properties of Cured Elastomer | | |
| Tensile Test | | |
| $M_{100}$, psi (MPa) | 1017 | 854 |
| $T_B$, psi (MPa) | 2192 | 2116 |
| $E_B$, % | 158 | 184 |
| Hardness, Shore A | 83 | 82 |
| Compression Set, % | | |
| 70 hrs/204° C. | 25 | 39 |
| Volume Swell, % | | |
| Water (3 days Liquid $H_2O$/232 ± 5° C.) | 24 | 2 |
| Ethylenediamine (7 Days/96–98° C.) | 85 | 19 |

I claim:

1. In a cured perfluoroelastomer composition prepared from polymerized units of tetrafluoroethylene, perfluoro (alkylvinylether) and a nitrile-containing monomer, the improvement wherein the perfluoroelastomer is crosslinked with a carbon-carbon linkage and wherein the cured perfluoroelastomer is substantially free from triazine linkages.

2. A cured perfluoroelastomer of claim 1 wherein the perfluoro (alkyvinylether) is perfluoro (methylvinylether).

3. A cured perfluoroelastomer of claim 2 wherein the perfluoroelastomer is polymerized from about 53–79.9 mole percent tetrafluoroethylene, 20–46.9 mole percent perfluoro (methylvinylether) and 0.1–2.5 mole percent nitrile-containing monomer.

4. A cured perfluoroelastomer of claim 3 wherein the nitrile-containing monomer consists essentially of perfluoro (8-cyano-5-methyl-3,6-dioxa-1-octene).

5. A cured perfluoroelastomer of claim 1 further characterized by an absence of triazine linkages, as determined by infrared analysis.

* * * * *